Oct. 7, 1930.  H. K. HITCHCOCK  1,777,643
APPARATUS FOR MAKING LAMINATED GLASS
Filed April 7, 1928    3 Sheets-Sheet 1

INVENTOR
H. K. Hitchcock
by
James C. Bradley
atty

Oct. 7, 1930.  H. K. HITCHCOCK  1,777,643
APPARATUS FOR MAKING LAMINATED GLASS
Filed April 7, 1928   3 Sheets-Sheet 2

Oct. 7, 1930.  H. K. HITCHCOCK  1,777,643
APPARATUS FOR MAKING LAMINATED GLASS
Filed April 7, 1928  3 Sheets-Sheet 3

INVENTOR
H. K. Hitchcock
by
James L. Bradley
Atty

Patented Oct. 7, 1930

1,777,643

UNITED STATES PATENT OFFICE

HALBERT K. HITCHCOCK, OF PITTSBURGH, PENNSYLVANIA, ASSIGNOR TO PITTSBURGH PLATE GLASS COMPANY, A CORPORATION OF PENNSYLVANIA

APPARATUS FOR MAKING LAMINATED GLASS

Application filed April 7, 1928. Serial No. 268,148.

Figure 2:
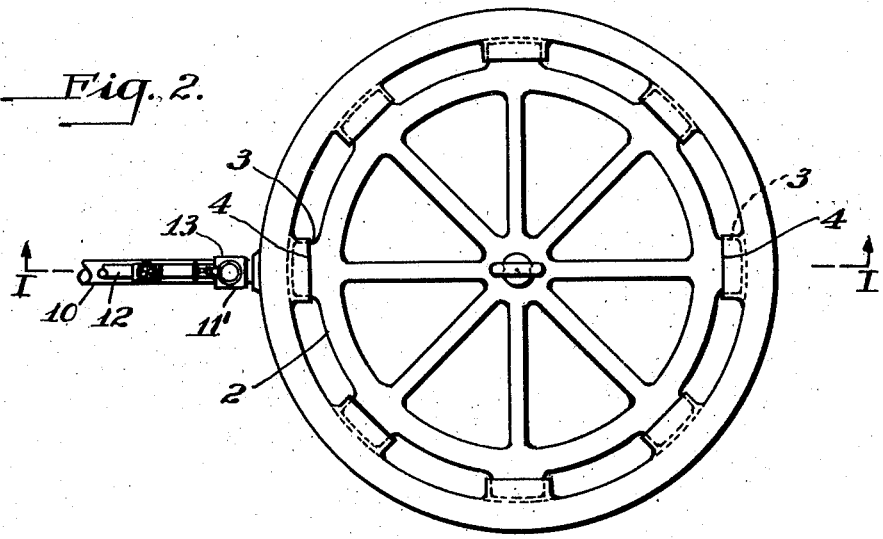
Figure 1:
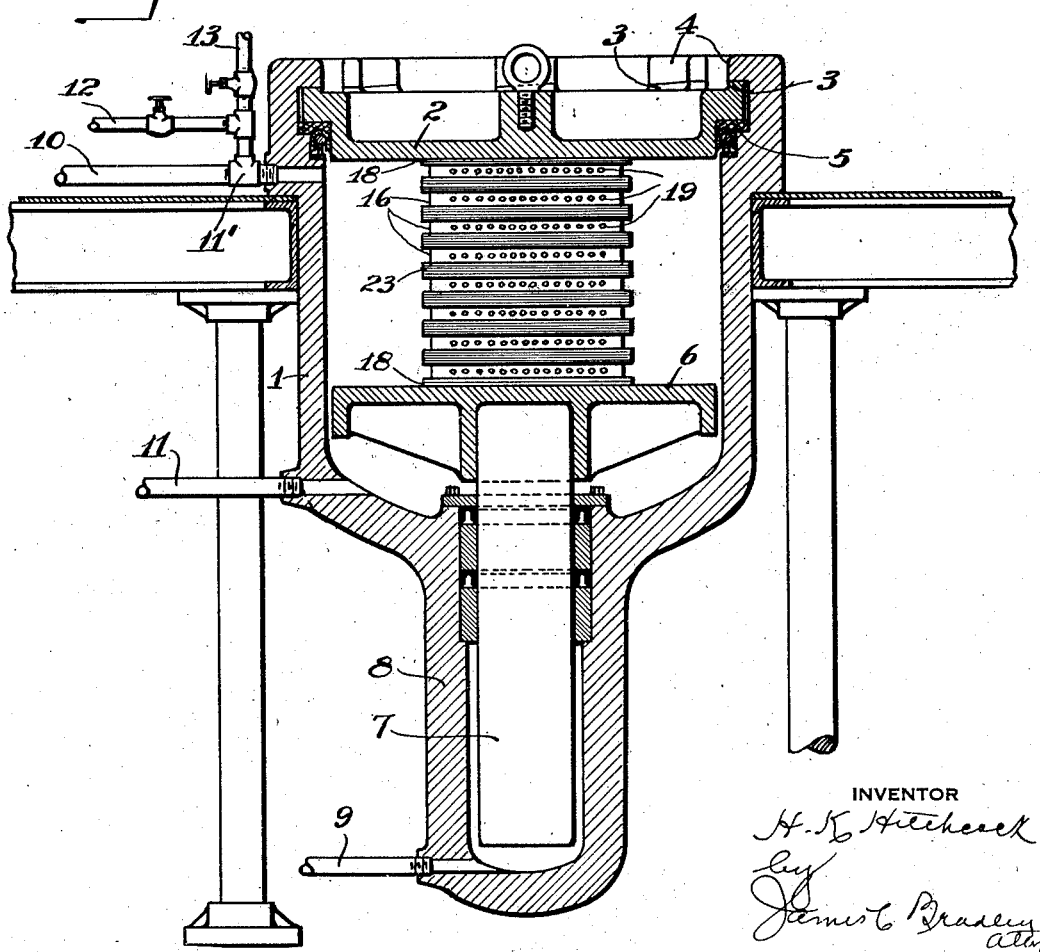
Figure 3:
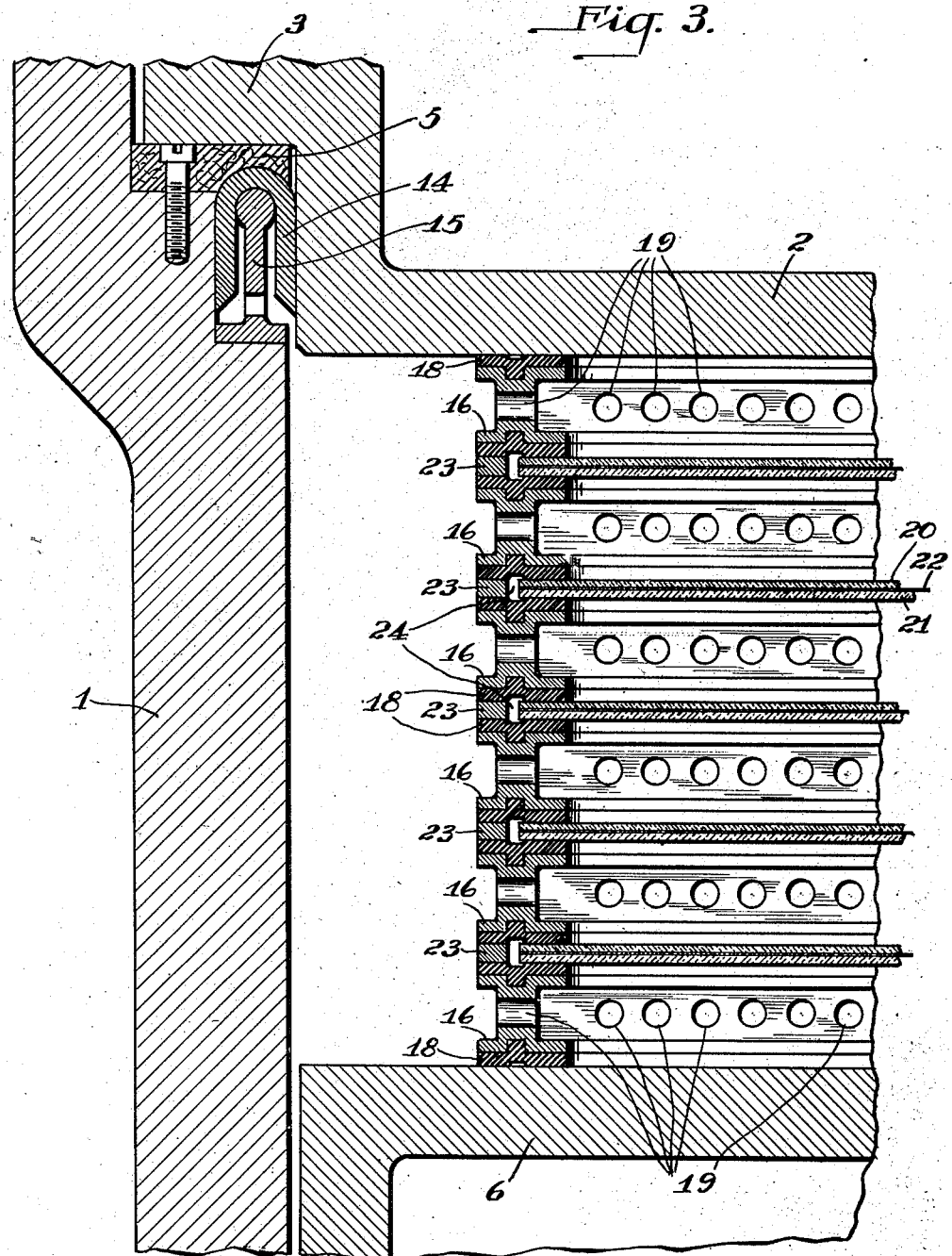
Figure 4:
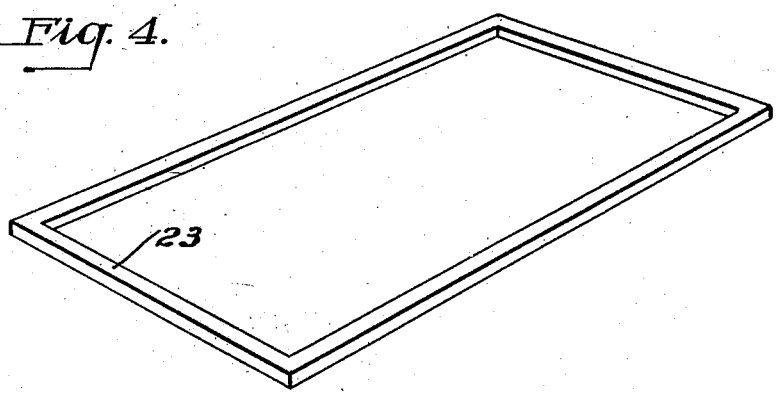
Figure 5:
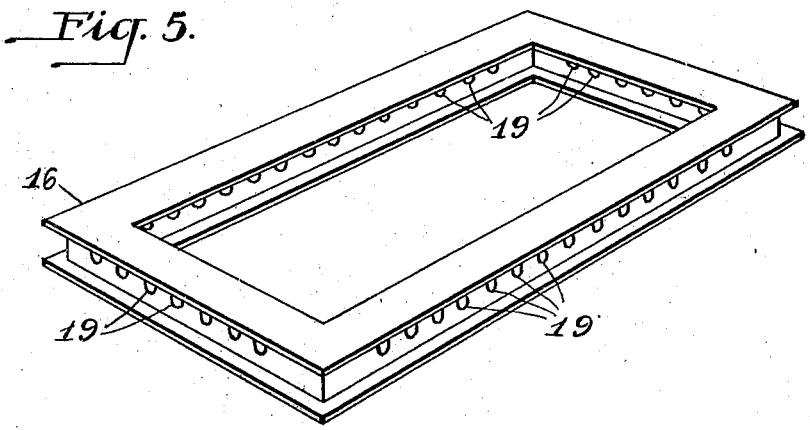

The invention relates to apparatus for making composite glass, wherein heat and pressure are applied to cause a joinder between the glass and celluloid. Composite glass ordinarily comprises two sheets of glass with a sheet of celluloid or equivalent material cemented therebetween, although a greater number of sheets may be employed. It is the practice to assemble the sheets with a coating of cement, such as gelatin, dried upon the surfaces of the glass sheets which are to be cemented to the celluloid, the heat subsequently applied serving to soften the gelatin and secure adhesion when pressure is applied. The present invention has for its primary objects, the provision of a process whereby quantity production may be secured with a minimum of labor in assembling the sheets preliminary to pressing and in removing them from the press after the operation is completed; the provision of a construction which permits the pressing of a maximum number of sheets in a press of a given size; and the provision of an apparatus of simple construction in which the cost incident to upkeep and replacement of parts is negligible. One embodiment of the invention is illustrated in the accompanying drawings, wherein:

Figure 1 is a vertical section through the apparatus on the line I—I of Fig. 2. Fig. 2 is a plan view. Fig. 3 is an enlarged vertical section of a part of the apparatus. And Figs. 4 and 5 are perspective views of the so-called ring and frame constituting a part of the apparatus.

Referring to the drawings, 1 is a vertical pressure tank circular in cross section and provided with the cover plate 2. This cover plate is provided with a series of spaced lugs 3 adapted to lie beneath the lugs 4 carried by the rim of the tank when the cover is rotated. The opposing surfaces of the two sets of lugs are slightly inclined, as indicated in Fig. 1, so that the cover is tightened by rotating it and a tight joint is secured by the use of the packing 5. Mounted for vertical movement in the cylinder or tank 1 is the platen 6 secured to the upper end of the plunger 7, such plunger being mounted for vertical movement in the hydraulic cylinder 8 which forms an extension of the cylinder 1. Fluid pressure is supplied for raising the plunger through the pipe 9. The cylinder 1 is provided with a pair of pipes 10 and 11 through which the water for providing the necessary pressure in the tank is circulated, the pipe 10 constituting the inlet pipe and the pipe 11 the outlet pipe. Connected to the T 11' on the inlet pipe 10 are the two pipes 12 and 13, the pipe 12 being connected to the exhaust system, while the pipe 13 is connected to a source of air pressure.

The details of the packing construction between the lead 2 and the upper end of the tank 1 will be seen by reference to Fig. 3. In addition to the packing 5 heretofore referred to, a second packing 14 is employed fitting around a follower 15. The pressure from the interior of the tank tends to press the packing 14 outward, thus increasing the tightness of the joint. The series of glass plates to be pressed are carried between the series of frames 16, 16, 16, 16 shown in Fig. 3. These frames are all similar in construction and each comprises a casting of H shape in cross section, to the upper and lower surfaces of which are vulcanized the rubber packing strips 18, 18. The side walls of the frames are each provided with the series of perforations 19 in order to permit of a circulation of liquid between the sets of plates. Each set of plates comprises the pair of sheets of glass 20 and 21 with the interposed sheet 22 of celluloid. The glass plates have films of gelatin on their surfaces next to the celluloid and the function performed in the tank is the application of pressure and heat in order to secure a proper joinder between the sheets. Lying between each pair of frames is a ring 23 of metal having a thickness approximately equal to the thickness of the set of sheets 20, 21 and 22. These rings serve to seal off the spaces between the frames lying outward from the edges of the glass sheets as these edges must be shielded from the application of hydraulic pressure when such pressure is applied to the interior of the tank.

In placing the frames and sheets to be secured together in the tank, the platen 6 is preferably raised to the level of the top of the tank or above such level and the frames are applied one after the other, a set of sheets 20, 21 and 22 being placed between each pair of frames, as indicated in Fig. 3, until the series is completed, after which the plunger 7 is lowered and the cover 2 is applied to the tank. It is now desirable to exhaust the air from the spaces 24 lying between the edges of the sheets 20, 21 and 22 and the rings 23, and in order to accomplish this function, the valve in the vacuum pipe 12 is opened so that the air is exhausted from the tank. The platen 6 is now moved up by the plunger 7 until the series of plates are tightly clamped between the platen and the cover 2, after which the valve in the vacuum line 12 is closed and hot water under pressure is circulated through the tank by means of the pipes 10 and 11 and suitable circulating devices. The temperature of the sheets 20, 21 and 22 is by this means brought up to a temperature of about 235 to 250 degrees F. and the pressure is raised to about 150 pounds per square inch. This degree of heat and pressure insures a proper joinder between the sheets to form the composite plates. After the temperature and pressure specified have been arrived at in the tank, the temperature is gradually reduced by circulating water of decreasing temperature through the pipes 10 and 11 and when the plates have been cooled off to about 100 degrees F., the pressure is released, it being desirable that the pressure should be maintained during the cooling off operation. The cover 2 is now removed from the tank and the plunger 7 raised to bring the series of frames and glass plates carried thereby above the level of the top of the tank so that they can be conveniently removed. This completes the cycle of operation and after the removal of the frames and the plates carried thereby, a new set of frames with sheets to be secured together may be applied to the platen 6 and the operation repeated. If desired, the set of frames and sheets may be assembled at a point remote from the tank and the entire series brought to the tank and applied in assembled form, suitable transfer devices being employed for this purpose.

What I claim is:

1. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, means for closing off the spaces between each pair of frames outward from the edges of the sheets, means for securing a movement of approach between said platens so that the series of frames are clamped tightly against the edges of the sets of sheets, and means for applying fluid pressure to the interior of the tank.

2. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, means for closing off the spaces between each pair of frames outward from the edges of the sheets, means for securing a movement of approach between said platens so that the series of frames are clamped tightly against the edges of the sets of sheets, and means for supplying heated liquid under pressure to the interior of the tank.

3. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, a ring between each pair of frames outward from the edges of the glass sheets for preventing the access of fluid pressure to the edges of the sheets, means for securing a movement of approach between said platens so that the series of frames are clamped tightly against the edges of the sets of sheets and against said rings, and means for applying fluid pressure to the interior of the tank.

4. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, a ring between each pair of frames outward from the edges of the glass sheets for preventing the access of fluid pressure to the edges of the sheets, means for securing a movement of approach between said platens so that the series of frames are clamped tightly against the edges of the sets of sheets and against said rings, and means for supplying heated liquid under pressure to the interior of the tank.

5. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, means for closing off the spaces between each pair of frames outward from the edges of the sheets, means for securing a movement of approach between said platens so that the series of frames are clamped tightly against the edges of the sets of sheets, means for applying fluid pressure to the interior of the tank, and means for applying suction to the interior of the tank preliminary to said movement of approach between the platens and preliminary to the application of fluid pressure to the interior of the tank.

6. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, means for closing off the spaces between each pair of frames outward from the edges of the sheet, means for applying suction to the tank, means for securing a movement of approach between said platens so that the series of frames are clamped tightly against the edges of the sets of sheets, and means for applying fluid pressure to the interior of the tank.

7. In combination with a tank and means for applying fluid pressure to the interior thereof, of a series of hollow frames having openings through their sides and with yielding packing means between their opposing faces, each pair being adapted to clamp between said faces a plurality of sheets to be joined into a composite plate, means for closing off the spaces between each pair of frames outward from the edges of the sheets, and means for applying pressure to the series of frames so that they are clamped tightly against the edges of the sets of sheets preliminary to the application of fluid pressure to the tank.

8. In combination with a tank having a pair of opposing platens, one of which is movable toward and from the other, a series of hollow frames having openings through their sides and provided with yielding packing means on their opposing faces, each pair of said frames being adapted to clamp between said faces a plurality of sheets to be joined into a composite plate, means for closing off the spaces between each pair of frames outward from the edges of the sheets, means for securing a movement of approach between said platens so that the series of frames are clamped tightly against the edges of the sets of sheets, and means for applying fluid pressure to the interior of the tank, one of said platens constituting the cover of the tank.

9. In combination with a tank having its upper side in the form of a removable cover, a platen mounted for vertical movement in the tank, a fluid operated plunger for raising and lowering the plunger, a series of hollow frames resting upon the platen and having openings through their sides and provided with yielding packing means on their opposite faces, each pair of said frames being adapted to clamp between said faces a plurality of sheets to be joined into a composite plate, means for closing off the spaces between each pair of frames outward from the edges of the sheets, and means for applying fluid pressure to the tank after the plunger has been moved up to clamp the series of frames and sheets between said platen and said removable cover.

In testimony whereof, I have hereunto subscribed my name this 13th day of March, 1928.

H. K. HITCHCOCK.